(12) United States Patent
Kim et al.

(10) Patent No.: US 8,998,186 B2
(45) Date of Patent: Apr. 7, 2015

(54) HYDRAULIC MOUNT FOR VEHICLE

(71) Applicant: Hyundai Motor Company, Seoul (KR)

(72) Inventors: Seung Won Kim, Seoul (KR); Jong Su Park, Daegu (KR)

(73) Assignee: Hyundai Motor Company, Seoul (KR)

( * ) Notice: Subject to any disclaimer, the term of this patent is extended or adjusted under 35 U.S.C. 154(b) by 75 days.

(21) Appl. No.: 13/846,295

(22) Filed: Mar. 18, 2013

(65) Prior Publication Data
US 2014/0001685 A1    Jan. 2, 2014

(30) Foreign Application Priority Data

Jun. 28, 2012  (KR) .................. 10-2012-0070374

(51) Int. Cl.
F16F 13/10    (2006.01)
(52) U.S. Cl.
CPC .............. F16F 13/10 (2013.01); F16F 13/105 (2013.01); F16F 13/106 (2013.01); F16F 13/107 (2013.01)
(58) Field of Classification Search
CPC ........ F16F 13/04; F16F 13/105; F16F 13/106
USPC .................................................. 267/140.13
See application file for complete search history.

(56) References Cited

U.S. PATENT DOCUMENTS

| | | | | |
|---|---|---|---|---|
| 5,501,433 A * | 3/1996 | Satori | .................. | 267/140.13 |
| 5,772,189 A * | 6/1998 | Satori et al. | .............. | 267/140.13 |
| 6,158,724 A * | 12/2000 | Takashima et al. | ...... | 267/140.13 |
| 6,257,562 B1 * | 7/2001 | Takashima et al. | ......... | 267/141.1 |
| 6,443,438 B2 * | 9/2002 | Satori et al. | .............. | 267/140.13 |
| 7,048,264 B2 * | 5/2006 | Anzawa et al. | ........... | 267/140.13 |
| 2007/0057421 A1* | 3/2007 | Nanno et al. | ............. | 267/140.13 |
| 2011/0006466 A1* | 1/2011 | Ichikawa et al. | ......... | 267/140.13 |

FOREIGN PATENT DOCUMENTS

| | | |
|---|---|---|
| JP | 09257090 A | 9/1997 |
| JP | 2004301193 A | 10/2004 |
| JP | 2012189170 A | 10/2012 |
| KR | 10-0857882 | 9/2008 |

* cited by examiner

*Primary Examiner* — Anna Momper
(74) *Attorney, Agent, or Firm* — Mintz Levin Cohn Ferris Glovsky and Popeo, P.C.; Peter F. Corless

(57) ABSTRACT

Disclosed herein is a hydraulic mount for a vehicle, wherein a serpentine wall that protrudes from a bottom surface of a membrane wherein the membrane operates as a bottom surface of the upper chamber, is bonded to an orifice lower plate and separates a central chamber and a serpentine inertia track. Furthermore, the serpentine inertia track is disposed along a circumference of the central chamber. The hydraulic mount additionally includes a plurality of orifice apertures that are formed in the orifice lower plate and configured to allow communication between the central chamber and the lower chamber.

3 Claims, 11 Drawing Sheets

(a) RELATED ART (b) PRESENT INVENTION (a) RELATED ART (b) PRESENT INVENTION

HYDRAULIC MOUNT FOR VEHICLE

CROSS-REFERENCE

This application claims the benefit of Korean Patent Application No. 10-2012-0070374, filed on Jun. 28, 2012 in the Korean Intellectual Property Office, the disclosure of which is incorporated herein in its entirety by reference.

BACKGROUND

1. Field of the Invention

The present invention relates to a hydraulic mount for a vehicle that reduces the number of assembly processes and improves productivity of the hydraulic mount. In addition, the hydraulic mount of the present invention eliminates the formation for a joint formed due to a reinforcement plate of a membrane reduces cost and weight of the hydraulic mount for the vehicle.

2. Description of the Related Art

In general, a power train including an engine and a transmission of a vehicle is mounted on an engine compartment using an engine mount and a transmission mount, and a roll rod to be supported at a sub frame. In this case, the sub frame is combined with a vehicle frame to form the engine compartment.

A method of mounting the engine and the transmission may be classified into an inertia support method and a central support method. The inertia support method uses a principal axis of inertia of the engine and is classified into a four-point support method and a three-point support method according to the number of mounts. In the three-point support method, the engine mount coupled to the engine and the transmission mount coupled to the transmission are mounted on the vehicle, and the roll rod is mounted on the sub frame. Furthermore, an inertia three-point support method is mainly used in front-wheel drive vehicles. Since the weight and cost of a sub frame increases for the inertia four-point support, the power train is supported by the three-point support method using an 'H'-shaped sub frame.

Moreover, to effectively reduce vibration and noise in the vehicle, the characteristics of mounts may be adjusted for reduction to be substantially high at vibration low speed and a dynamic spring constant to be substantially low at vibration high speed. To satisfy these characteristics, a hydraulic mount for a vehicle may be applied to a bottom surface of an insulator formed of rubber. The engine mount is usually manufactured as a hydraulic mount.

The hydraulic mount has a structure in which wide area vibration, such as vibration with low frequency/high amplitude or vibration with high frequency/low amplitude that is input when the engine is driven, may be reduced using viscosity of a fluid and characteristics of rubber. A structure of an engine mount 1 for a vehicle according to the related art will now be described with reference to FIG. 1.

As illustrated in FIG. 1, the vehicle engine mount 1 having the shape of a hydraulic mount according to the related art includes a center bolt 10 coupled to an engine, an inner core 20 through which the center bolt 10 passes, an insulator 30 formed of rubber and integrated with the inner core 20 by a vulcanization molding process, an outer pipe 40 in which a lower portion of the insulator 30 is inserted, which is disposed to surround the insulator 30 and is coupled to a vehicle via a mounting bracket (not shown), a diaphragm 50 disposed on the bottom surface of the insulator 30, an orifice lower plate 60 disposed on a top surface of the diaphragm 50 from a lower interior of the insulator 30, and a membrane 80 inserted between an interior of the orifice lower plate 60 and an orifice upper plate 70.

Furthermore, an upper chamber 2 is a space is formed between the insulator 30, the orifice lower plate 60, and the membrane 80 in which a fluid is sealed, and a lower chamber 3 is a space formed by the membrane 80, the orifice lower plate 60, and the diaphragm 50, is partitioned off from the upper chamber 2 by the membrane 80 and is disposed below the upper chamber 2.

Additionally, an inertia track 61 is disposed on a circumference of the orifice lower plate 60 in a serpentine shape along circumferences of the upper chamber 2 and the lower chamber 3. A top surface of the serpentine inertia track 61 is covered by the orifice upper plate 70. An inner path of the inertia track 61 is connected to the upper chamber 2 via an opening 71 formed through the orifice upper plate 70. Thus, when an inner volume of the upper chamber 2 is reduced, the fluid in the upper chamber 2 is moved to the inertia track 61 via the opening 71 of the orifice upper plate 70.

In the hydraulic engine mount 1 for the vehicle having the above structure, when vibration is transmitted from the engine, the inner core 20 and the insulator 30 are deformed such that the volume of the upper chamber 2 is adjusted. In particular, the fluid corresponding to the adjusted volume is moved from the upper chamber 2 to the lower chamber 3. Specifically, the fluid flows into the serpentine inertia track 61 via the opening 71 of the orifice upper plate 70 and then flows along the inertia track 61 (see arrow A), or when the fluid passes through a gap between the membranes 80 (see arrow B), shock load is reduced, as illustrated in FIG. 2.

In other words, shock from the top surface of the engine mount 1 is transmitted to the fluid in the upper chamber 2. The shock is converted into thermal energy when the fluid passes through the gap between the membranes 80, and is reduced. The remaining shock load is transmitted to the fluid in the lower chamber 3, and a shock quantity is again reduced.

When the quantity of the fluid that corresponds to the deformed volume of the inner core 20 and the insulator 30 is larger than the movement quantity of the fluid that passes through the gap between the membranes 80, in other words, when vibration with low frequency and high displacement occurs, the fluid does not pass through the gap between the membranes 80 and flows along the serpentine inertia track 61. In this case, vibration with a particular frequency is resonant with the fluid in the serpentine inertia track 61, and thus a large attenuation force is generated.

On the other hand, when vibration with high frequency and low displacement is input from the engine, displacement is within the range of movement of the membrane 80. Thus, the quantity of the fluid that corresponds to the deformed volume of the inner core 20 and the insulator 30 does not pass through the serpentine inertia track 61 having a relatively large flow resistance but passes the gap between the membranes 80 having a relatively small flow resistance. In this case, the fluid passes through the lower chamber 3 from the upper chamber 2 within a substantially short amount of time, and thus vibration is reduced.

The purpose of the hydraulic engine mount 1 is to attenuate a particular frequency and to reduce dynamic characteristics that may not be achieved using an existing rubber type engine mount. The hydraulic engine mount 1 improves ride performance by giving attenuation characteristics in a frequency band of 10 to 12 Hz.

However, a hydraulic engine mount for a vehicle having a dual orifice structure, as illustrated in FIG. 3, has been developed to increase a dielectric constant in a frequency band of 100 to 130 Hz.

In the dual orifice structure, a secondary nozzle 72 having a predetermined height (i.e., 5 mm or higher) connects an installation space between the upper chamber 2 and the lower membrane 80, and protrudes from a center of the orifice upper plate 70 upwards. Furthermore, vibration (e.g., 12 Hz) is attenuated by primary orifice action in which the fluid is moved along the inertia track 61, and dynamic characteristics (130 Hz) are reduced by secondary orifice action in which the fluid flows via the secondary nozzle 72, wherein the secondary orifice action is separate from an orifice action in which the fluid passes through the gap between the membranes 80.

In the primary orifice action, vibration of a power train is suppressed by damping in a frequency band of 10 to 12 Hz to improve vehicle travel performance, and in the secondary orifice action, dynamic characteristics in a frequency band of 130 Hz are reduced to improve NVH (noise vibration) performance by increasing the dielectric constant. In this way, in the dual orifice structure, ride performance and NVH performance may be simultaneously improved (e.g., reduction of vibration in other frequency regions).

However, in the hydraulic mount having the dual orifice structure according to the related art, a joint may be formed due to the structure of a free movement type membrane, and the number of assembly processes may increase. Specifically, as illustrated in FIGS. 4 through 6, a configuration for the dual orifice structure includes three components, such as the orifice upper plate 70, the orifice lower plate 60, and the membrane 80. Furthermore, a reinforcement plate 81 formed of steel is inserted in the membrane 80. Thus, when the membrane 80 moves freely, the reinforcement plate 81 is excited between the orifice upper plate 70 and the orifice lower plate 60 due to high frequency vibration thereby causing a joint to be formed (see FIG. 4).

In addition, since the membrane 80 is inserted between the orifice upper plate 70 and the orifice lower plate 60, four rivets 60a are required for assembly to fix the orifice upper plate 70 and the orifice lower plate 60 in addition to outer pipe curling fixing. Thus, addition components are required thereby increasing the assembly process of the hydraulic mount.

Furthermore, due to the protrusion structure and height of the secondary nozzle 72 formed on the orifice upper plate 70, when tuning including installation of a plunger in the upper chamber 2 is performed, a space in which the plunger is to be installed, may be insufficient, tuning may be limited, and the size of the hydraulic mount for the vehicle may increase.

SUMMARY

The present invention provides a hydraulic mount for a vehicle that may prevent the formation of a joint due to a reinforcement plate of a membrane, may reduce the number of assembly processes, may improve workability and productivity of the hydraulic mount, and may reduce cost and weight of the hydraulic mount.

The present invention also provides a hydraulic mount for a vehicle that may improve tuning the hydraulic mount and decrease the size of the hydraulic mount compared to a hydraulic mount having a protrusion height from a secondary nozzle in a dual orifice structure.

According to one embodiment, the present invention provides a hydraulic mount for a vehicle including: an insulator that forms an upper chamber; a diaphragm disposed on a bottom surface of the insulator and that forms a lower chamber; an orifice lower plate disposed on a top surface of the diaphragm; and a membrane disposed on a top surface of the orifice lower plate, wherein the orifice lower plate is disposed between the membrane and the diaphragm; a serpentine wall that protrudes from a bottom surface of the membrane wherein the membrane operates as a bottom surface of the upper chamber, wherein the serpentine wall is bonded to the orifice lower plate and separates a central chamber; a serpentine inertia track disposed along a circumference of the central chamber; and a plurality of orifice apertures formed in the orifice lower plate and configured to allow communication between the central chamber and the lower chamber.

The orifice lower plate may be manufactured in a form of a container in which a flange part is formed along the edges of the container, and the orifice lower plate may form the inertia track when the edges of the membrane and the flange part of the orifice lower plate are bonded to each other. Furthermore, a fluid hole may be formed in the membrane and may allow communication between the upper chamber and the inertia track. Moreover, the membrane may be manufactured using rubber by performing molding and vulcanization processes.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g., fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention will now be described more fully with reference to the accompanying drawings, in which exemplary embodiments of the invention are shown, so that one of ordinary skill in the art can easily embody the present invention.

Figure 7:
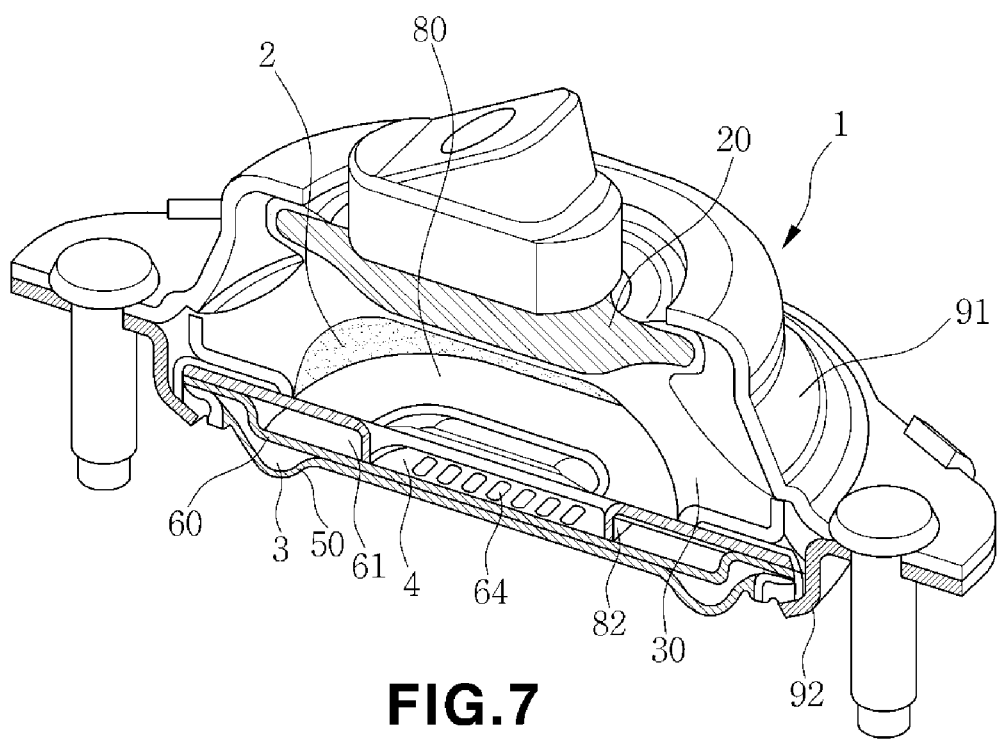
FIG. 7 is an exemplary view of a hydraulic mount for a vehicle according to an exemplary embodiment of the present invention.
Figure 8:
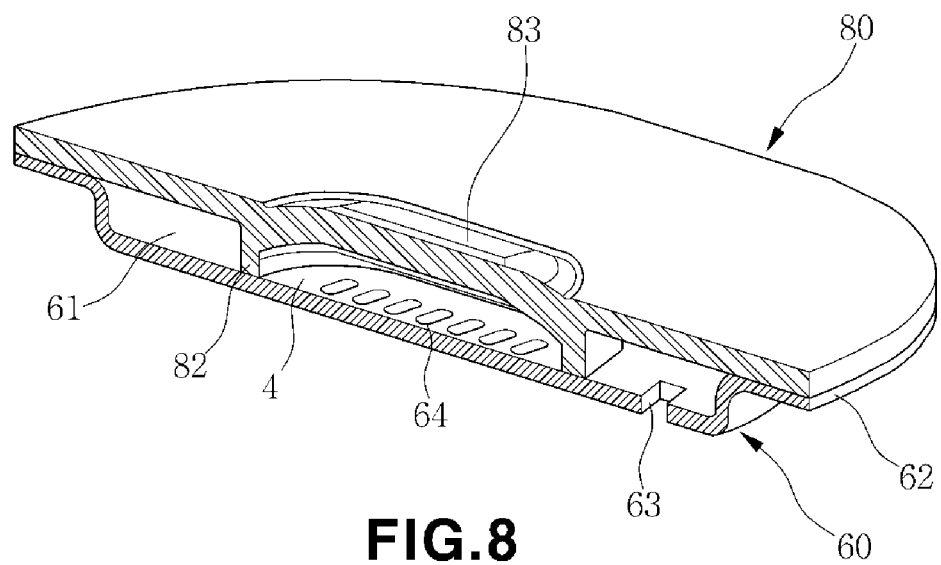
FIG. 8 is an exemplary view of components for a dual orifice structure of the hydraulic mount for the vehicle illustrated in FIG. 7 according to an exemplary embodiment of the present invention.
Figure 9:
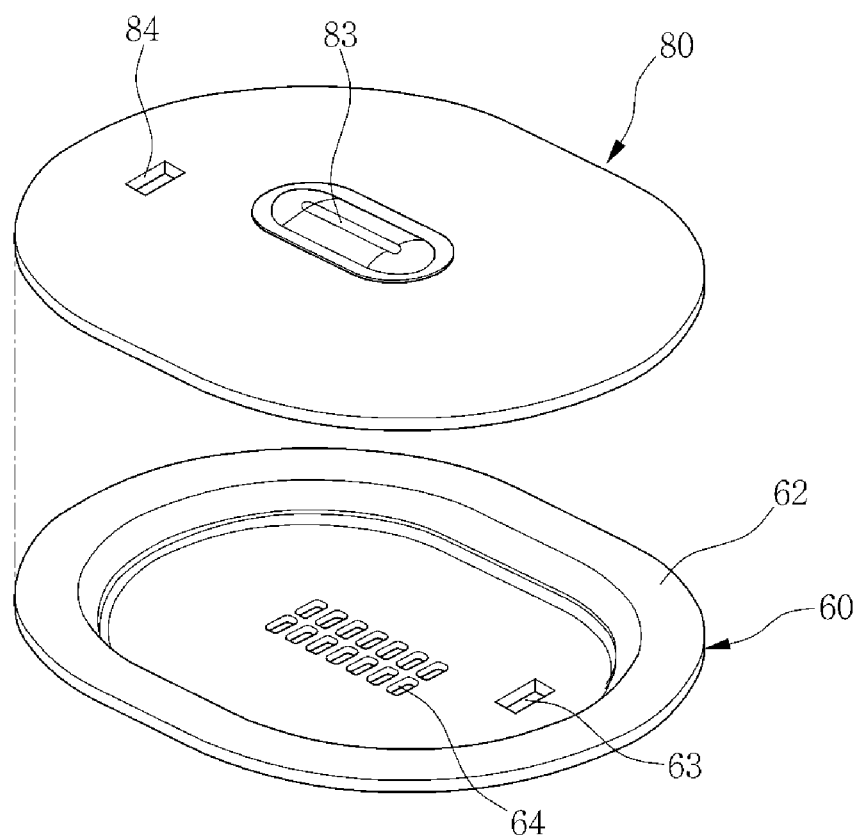
FIG. 9 is an exemplary detailed view of the components for the dual orifice structure of the hydraulic mount for the vehicle of FIG. 7 according to an exemplary embodiment of the present invention.

FIG. 7 is an exemplary view of a hydraulic mount 1 for a vehicle according to an exemplary embodiment of the present invention, FIG. 8 is an exemplary view of components for a dual orifice structure of the hydraulic mount 1 for the vehicle illustrated in FIG. 7, and FIG. 9 is an exemplary detailed view of the components for the dual orifice structure of the hydraulic mount 1 for the vehicle of FIG. 7.

The present invention may prevent a joint from forming due to the presence of a reinforcement plate in a membrane of a hydraulic mount for a vehicle according to the related art. In addition, the present invention may reduce the number of assembly processes, improve workability and productivity of the hydraulic mount and reduce cost and weight of the hydraulic mount. Furthermore, the present invention eliminates the reinforcement plate in the membrane and an existing membrane and an existing orifice upper plate may be configured as one component and orifice apertures in an orifice lower plate may operate as a secondary nozzle.

Specifically, the hydraulic mount may include a center bolt (not shown) coupled to a plurality of components, such as an engine and a transmission, an inner core 20 wherein the center bolt (not shown) is integrated with the inner core, and an insulator 30 formed of rubber and integrated with the inner core 20 of the hydraulic mount 1 for a vehicle according to the present invention are the same as those of the related art, thus a detailed description will be omitted.

Reference numerals 91 and 92 of FIG. 7 represent an upper housing and a lower housing disposed around the insulator 30 that forms an upper chamber 2 and that are coupled with the vehicle, respectively, and a diaphragm 50 that forms a lower chamber 3 is disposed on a bottom surface of the insulator 30.

Additionally, an orifice lower plate 60 may be disposed on the top surface of the diaphragm 50 from an interior of the lower housing 92, and a membrane 80 may be disposed on a top surface of the orifice lower plate 60 using rubber and performing molding and vulcanization processes. According to the present invention, the membrane 80 may operate as the existing orifice upper plate and thus, the orifice upper plate is omitted.

In the above structure, an internal space between the insulator 30 and the membrane 80 forms the upper chamber 2 in which a fluid is sealed. Furthermore, unlike a conventional structure in which the orifice upper plate forms a bottom surface of the upper chamber 2, according to the present invention, the orifice upper plate is omitted and thus, the membrane 80 operates as the bottom surface of the upper chamber 2.

The lower chamber 3 in which the fluid is sealed, may be disposed under the upper chamber 2. The lower chamber 3 is a space formed by the orifice lower plate 60 and the diaphragm 50 and may be separated from the upper chamber 2 by the orifice lower plate 60 and the membrane 80.

According to the present invention, the membrane 80 may be manufactured using rubber by performing the molding and vulcanization processes. The membrane 80 may be used as one component that operates as the existing orifice upper plate and the membrane simultaneously.

Moreover, the membrane 80 may be disposed to cover a top surface of the orifice lower plate 60. Thus, a bottom portion of the membrane 80 may form an inertia track 61 disposed in a serpentine shape along a circumference of a central chamber 4 described in further detail below, together with the orifice lower plate 60, and a top surface of the inertia track 61 may be covered by the membrane 80.

The orifice lower plate 60 may be manufactured in the form of a container in which a flange part 62 having a predetermined width may be formed over the entire circumference of the container along edges of the container, and the edges of the membrane 80 and the flange part 62 of the orifice lower plate 60 may be bonded to each other.

Additionally, a serpentine wall 82 may protrude from a central bottom surface of the membrane 80 downwards to form the orifice lower plate 60 and the inertia track 61, and a lower end of the serpentine wall 82 may contact the bottom surface of the orifice lower plate 60. Thus, the bottom surface and sidewalls of the orifice lower plate 60 and the serpentine wall 82 of the membrane 80 may form the inertia track 61 which is a serpentine fluid path between the upper chamber 2 and the lower chamber 3.

In particular, an internal space of the serpentine wall 82 between the membrane 80 and the orifice lower plate 60 may form a central chamber 4 that is separated from the inertia track 61 by the serpentine wall 82. Specifically, the central chamber 4 may be separated from the upper chamber 2 by the membrane 80, which is separated from the lower chamber 3 by the orifice lower plate 60, and from the inertia track 61 by the serpentine wall 82. The central chamber 4 has a structure in which the inertia track 61 is disposed along a circumference of the central chamber 4.

Reference numeral 83 of FIGS. 8 and 9 represents a portion that is formed by protruding a central part of the membrane 80 convexly upwards to generate a restoring force. In addition, a fluid hole 84 may be formed in one side of the membrane 80 to allow communication between an internal space between the upper chamber 2 and the inertia track 61, and a fluid hole 63 may be formed in one side of the orifice lower plate 60 that forms the inertia track 61 to allow communication between an internal space between the inertia track 61 and the lower chamber 3.

Figure 4:
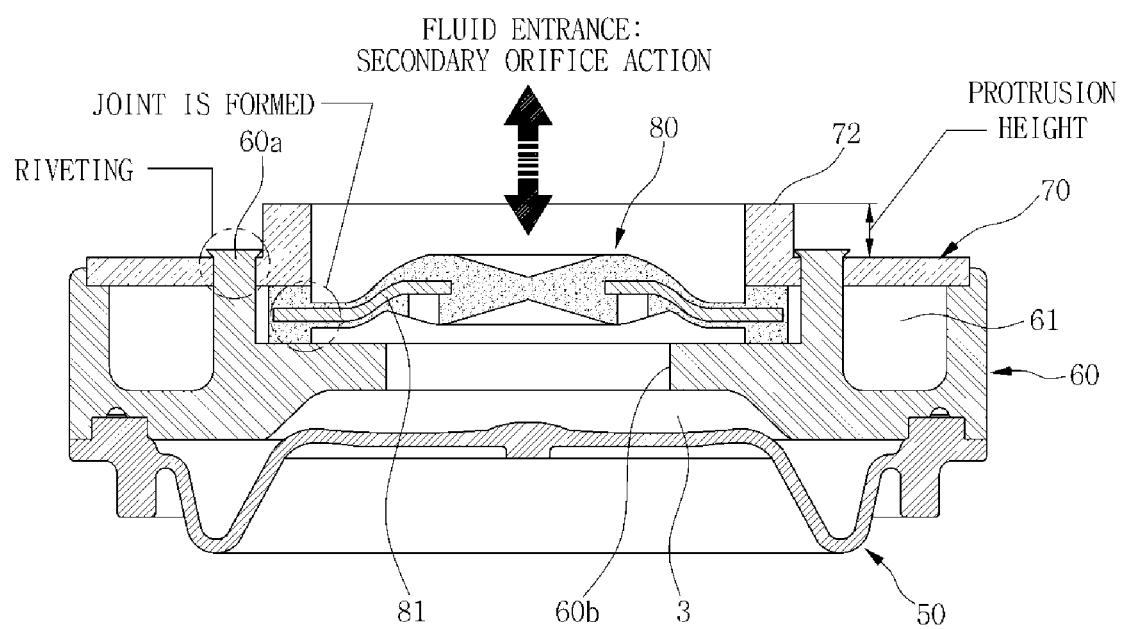
FIGS. 4 through 6 illustrate exemplary hydraulic engine mounts for a vehicle having a dual orifice structure according to the related art.
Figure 5:
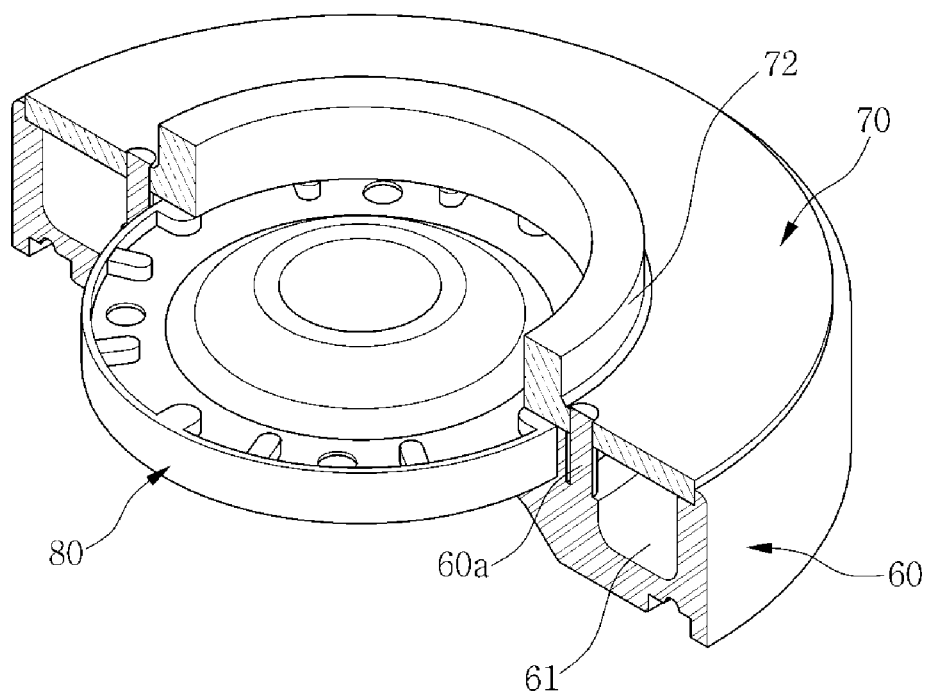
Figure 6:
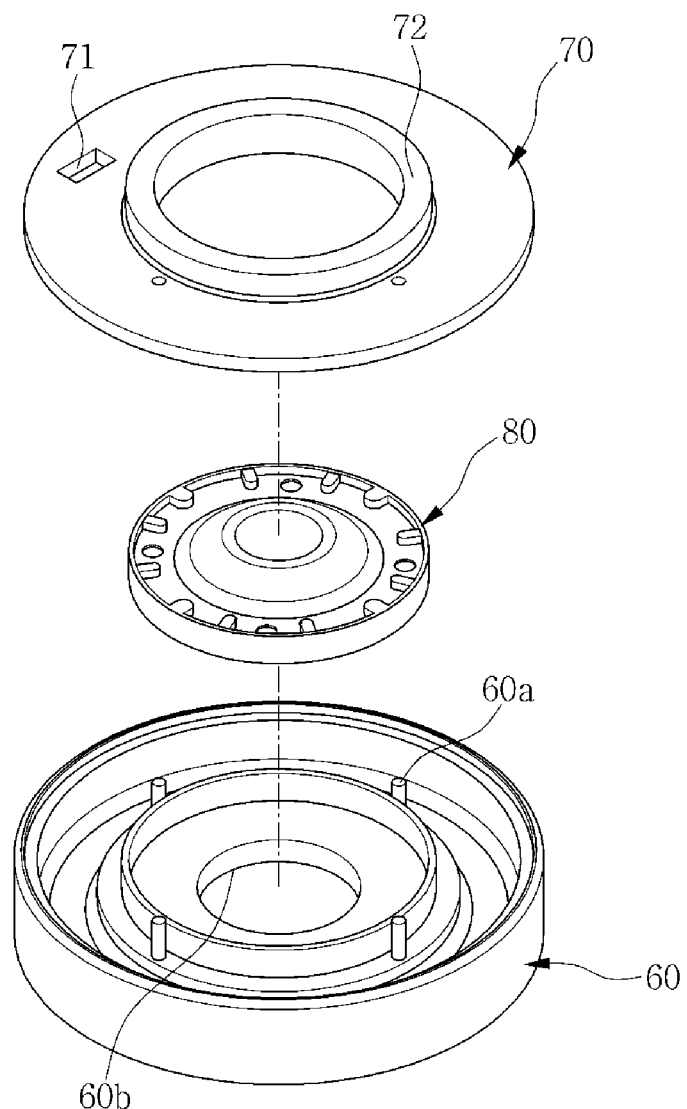

The central chamber 4 and the lower chamber 3 may be connected via a plurality of orifice apertures 64 formed in the center of the orifice lower plate 60. Unlike in the conventional hydraulic mount in which one opening (60b of FIGS. 4 and 6) having a substantially large diameter is formed in the center of the orifice lower plate, the plurality of orifice apertures 64 have substantially smaller diameters.

The orifice apertures 64 of the orifice lower plate 60 operate as the secondary nozzle formed in the orifice upper plate of the conventional hydraulic mount. When the fluid is moved between the central chamber 4 and the lower chamber 3 via the orifice apertures 64, existing secondary orifice action may occur due to the orifice apertures 64 through which the fluid may flow. Therefore, in the present invention, the conventional secondary nozzle that protrudes from the inside of the upper chamber 2 may be eliminated, and secondary orifice action may be performed by the orifice apertures 64 in which no additional space is required. Thus, there is no limitation in installing tuning components including a plunger, in the upper chamber 2.

In other words, problems relating to an insufficient installation space for tuning components including a plunger, tuning limitation, and an increase in the size of the hydraulic mount for the vehicle may be eliminated. That is, a degree of freedom in tuning and designing the hydraulic mount for the vehicle may be improved and the size of the hydraulic mount for the vehicle may be reduced.

In this manner, in the hydraulic mount according to the present invention, the existing orifice upper plate and the reinforcement plate in the membrane may be eliminated, and the vulcanization integrated type membrane may operate as the orifice upper plate to reduce the number of components for a dual orifice structure. Thus, a problem relating to a joint formed due to the movement of the membrane and excitation of the reinforcement plate may be eliminated, and the cost and weight of the hydraulic mount for the vehicle may be reduced due to a reduction in the number of components. In addition, since a conventional process of assembling four rivets on the orifice upper plate and the orifice lower plate may be eliminated, the number of assembly processes may be reduced, and workability and productivity of the hydraulic mount for the vehicle may be improved.

Figure 1:
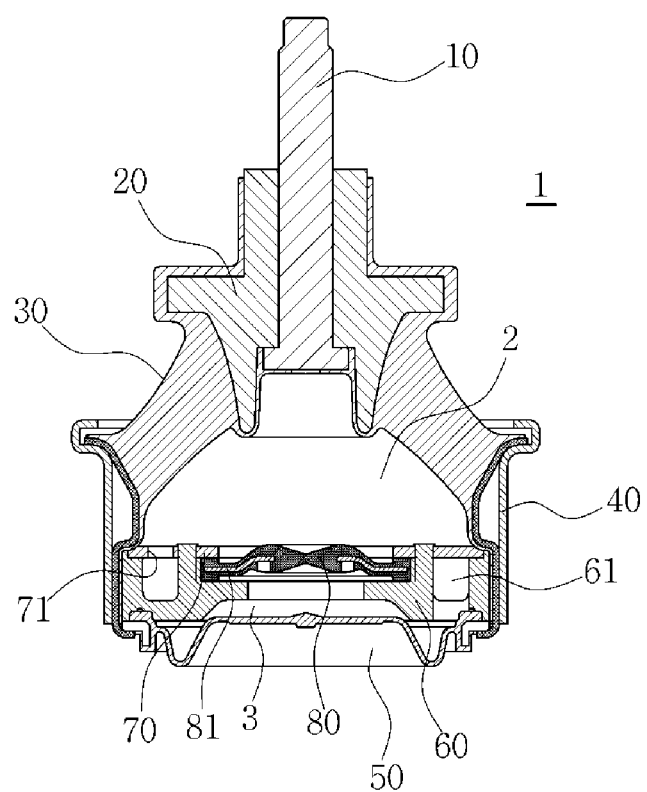
FIGS. 1 and 2 are exemplary cross-sectional views of a hydraulic engine mount for a vehicle having a general orifice structure according to the related art.
Figure 2:
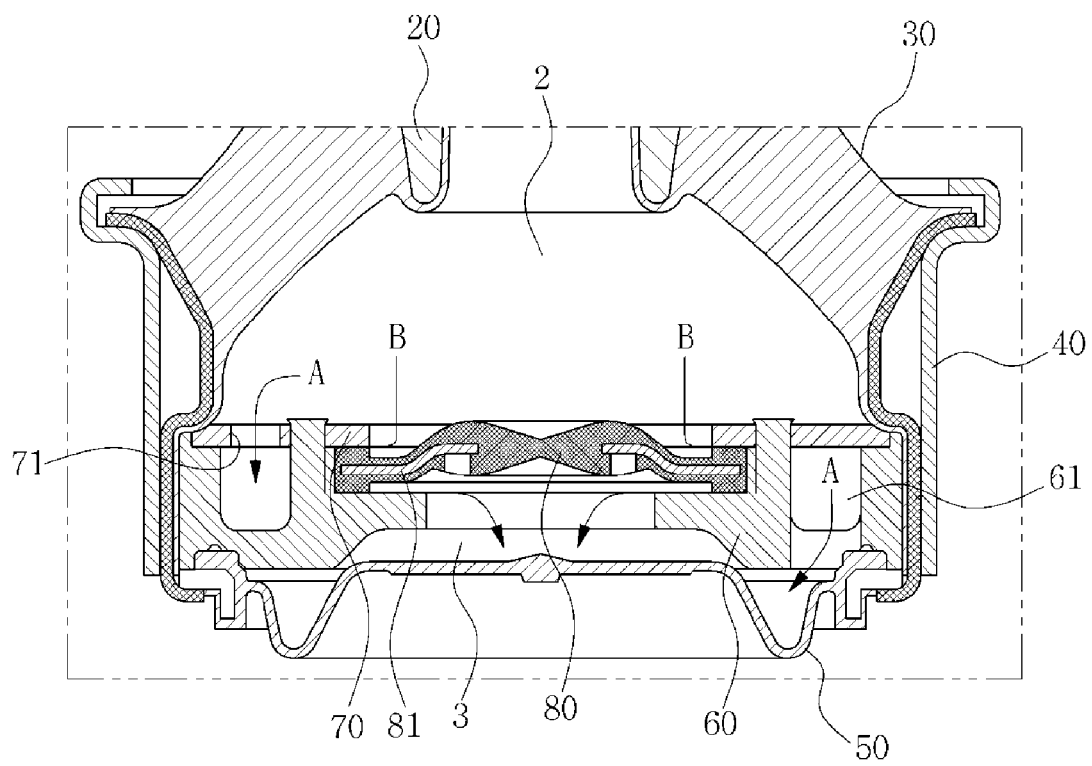
Figure 3:
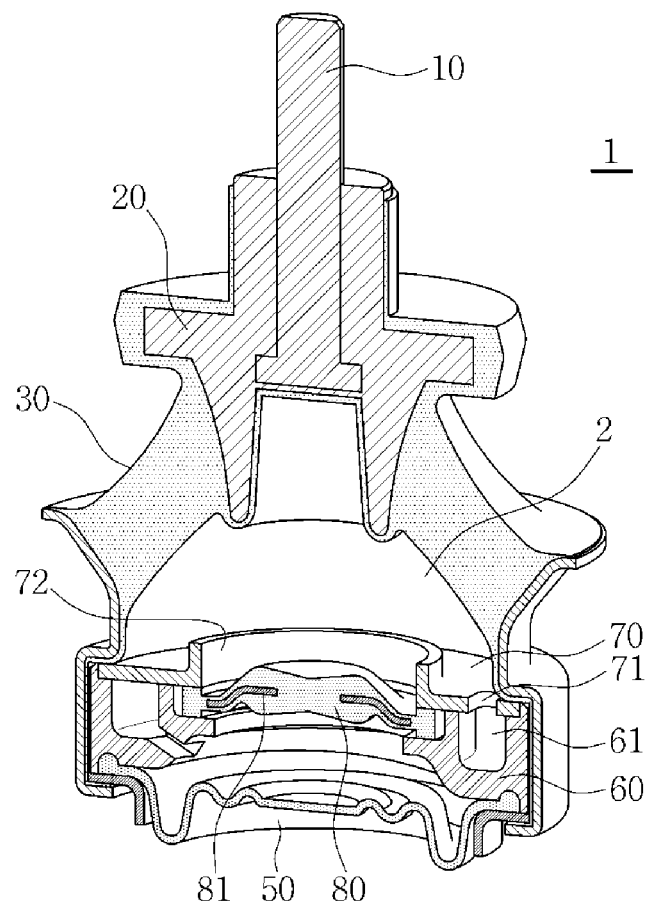
FIG. 3 is an exemplary view of a hydraulic engine mount for a vehicle having a dual orifice structure according to the related art.
Figure 10:
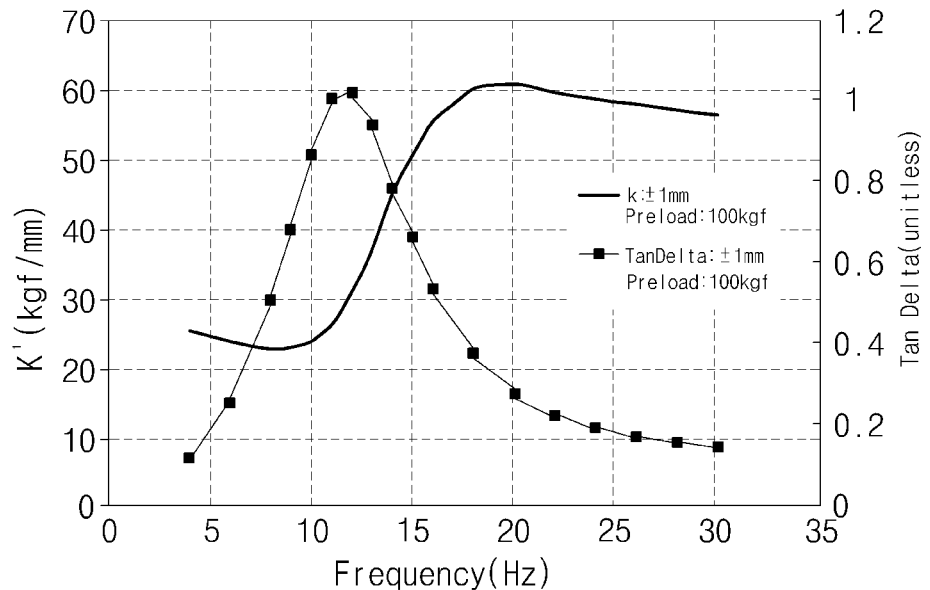
FIGS. 10 and 11 are exemplary graphs comparing performances of the hydraulic mount for the vehicle according to the present invention with performances of the hydraulic mount for the vehicle according to the related art.
Figure 10:
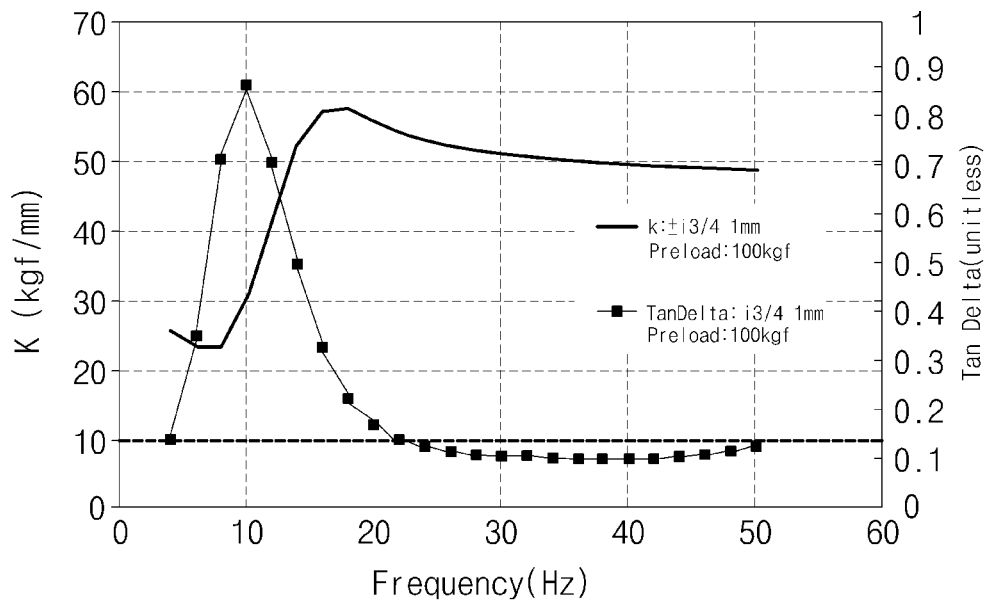
Figure 11:
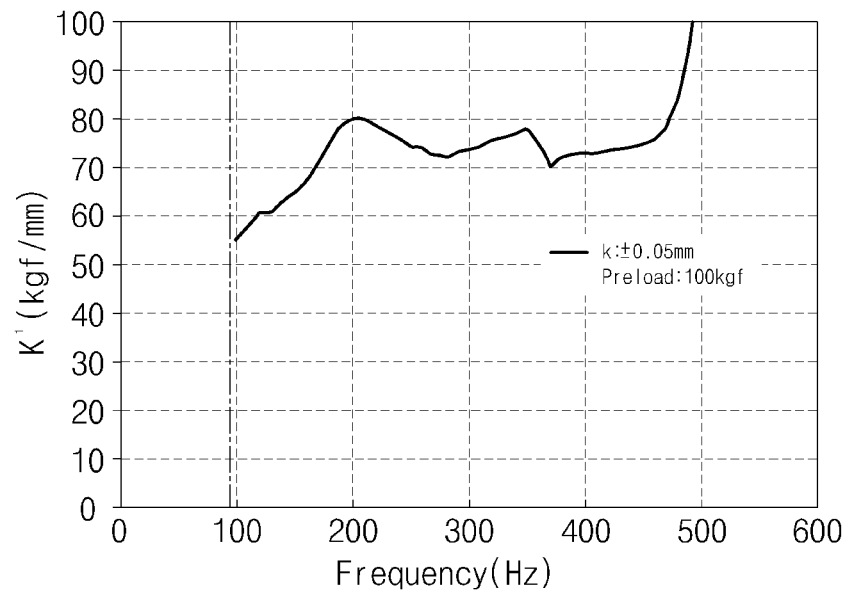
Figure 11:
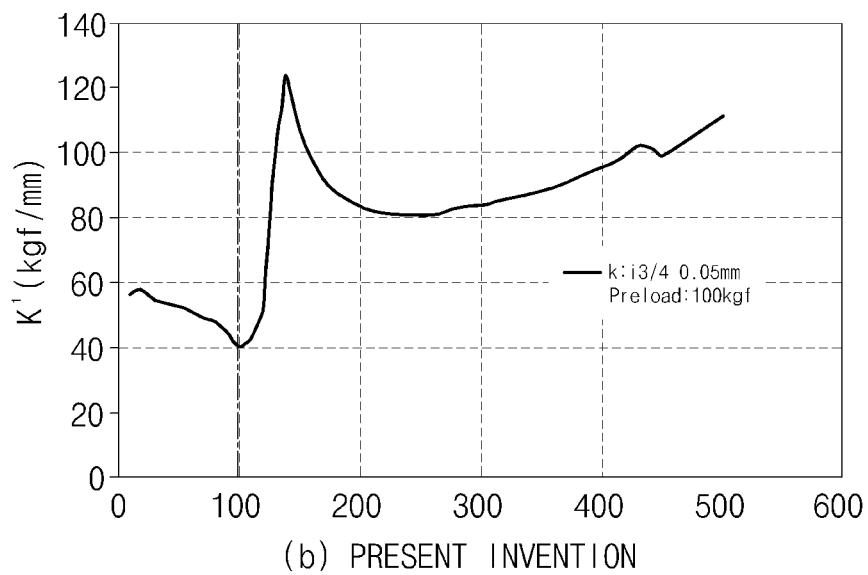

FIGS. 10 and 11 are exemplary graphs comparing performances of the hydraulic mount for the vehicle according to the present invention and performances of the hydraulic mount for the vehicle according to the related art. FIGS. 10 and 11 show results of evaluating vehicle travel performance and NVH performance of the hydraulic mount for the vehicle of the present invention having a dual orifice structure using the vulcanization integrated type membrane and secondary orifice apertures and vehicle travel performance and NVH performance of the hydraulic mount for the vehicle of the related art having a general orifice structure illustrated in FIGS. 1 and 2.

When the dual orifice structure according to the present invention is applied to the hydraulic mount using the orifice structure, vehicle travel performance were shown to be reduced to a loss factor of about 0.85 (see FIG. 10), and for NVH performance, dynamic characteristics were shown to be reduced from about 55 kgf/mm to 40 kgf/mm.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A hydraulic mount for a vehicle, comprising:
an insulator configured to form an upper chamber;
a diaphragm disposed on a bottom surface of the insulator and configured to form a lower chamber;
an orifice lower plate disposed on a top surface of the diaphragm;
a membrane disposed on a top surface of the orifice lower plate, wherein the orifice lower plate is disposed between the membrane and the diaphragm;
a serpentine wall that protrudes from a bottom surface of the membrane wherein the membrane is configured to operate as a bottom surface of the upper chamber, and the serpentine wall is bonded to the orifice lower plate;
a central chamber formed between the membrane and the orifice lower plate;
a serpentine inertia track disposed along a circumference of the central chamber, wherein the serpentine wall is configured to separate the central chamber from the serpentine inertia track; and
a plurality of orifice apertures formed in the orifice lower plate and configured to allow communication between the central chamber and the lower chamber,
wherein a top surface and sidewall of the orifice lower plate and the serpentine wall of the membrane form the inertia track which is a serpentine fluid path between the upper chamber and the lower chamber, and
wherein a first fluid hole is formed in one side of the membrane to allow communication between the upper chamber and the inertia track, and a second fluid hole is formed in one side of the orifice lower plate that forms the inertia track to allow communication between the inertia track and the lower chamber.

2. The hydraulic mount for the vehicle of claim 1, wherein the orifice lower plate is formed as a container in which a flange part is formed along edges of the container, and is configured to form the serpentine inertia track when the edges of the membrane and the flange part of the orifice lower plate are bonded.

3. The hydraulic mount for the vehicle of claim 1, wherein the membrane is manufactured using rubber by performing molding and vulcanization processes.

* * * * *